United States Patent [19]

Arai et al.

[11] Patent Number: 5,008,789
[45] Date of Patent: Apr. 16, 1991

[54] FLUORESCENT LAMP HAVING ULTRAVIOLET REFLECTING LAYER

[75] Inventors: Kiyotaka Arai; Hirofumi Sumoto; Keizi Ichinomiya, all of Anan, Japan

[73] Assignee: Nichia Kagaku Kogyo K.K., Tokushima, Japan

[21] Appl. No.: 479,967

[22] Filed: Feb. 14, 1990

[30] Foreign Application Priority Data

Feb. 22, 1989 [JP] Japan .................................. 1-44488

[51] Int. Cl.$^5$ .............................................. F21M 3/14
[52] U.S. Cl. ..................... 362/255; 362/260; 362/293; 313/112; 313/486; 313/489; 313/635
[58] Field of Search ............... 313/489, 112, 113, 635, 313/486; 362/260, 255, 293, 310, 217

[56] References Cited

U.S. PATENT DOCUMENTS 4,079,288  3/1978  Maloney et al. ................. 313/635 X
4,924,141  5/1990  Taubner et al. ...................... 313/488

FOREIGN PATENT DOCUMENTS 41-11628    6/1941   Japan .
50-150287  12/1975   Japan .
53-867      1/1978   Japan .
62-12055    1/1987   Japan .
603326      6/1948   United Kingdom .

Primary Examiner—Stephen F. Husar
Attorney, Agent, or Firm—Nixon & Vanderhye

[57] ABSTRACT

A fluorescent lamp of this invention includes an ultraviolet reflecting layer of a nonemission material essentially consisting of α-alumina, and a light-emitting layer. The nonemission material is a white powder having an average grain size of 0.05 μm to 2 μm. The light-emitting layer is formed on the discharge generation region side of the ultraviolet reflecting layer. According to this invention, ultraviolet ray having passed through the light-emitting layer without being absorbed therein are reflected by the ultraviolet reflecting layer and are radiated onto the light-emitting layer again. For this reason, the light-emitting layer is more frequently excited with the ultraviolet rays to increase a luminous flux.

4 Claims, 1 Drawing Sheet

FLUORESCENT LAMP HAVING ULTRAVIOLET REFLECTING LAYER

BACKGROUND OF THE INVENTION

1 Field of the Invention

The present invention relates to an improved fluorescent lamp and, more particularly, to a fluorescent lamp having excellent emission characteristics even if an amount of phosphor coated on a glass bulb is small. 2. Description of the Related Art A luminous flux of a fluorescent lamp is increased when an amount of phosphor coated on the inner surface of a glass bulb is increased within a predetermined range. When the amount of phosphor is increased, however, cost of the resultant fluorescent lamp becomes high. In particular, the cost is greatly increased in a fluorescent lamp using a rare-earth phosphor.

For example, a high color rendering type fluorescent lamp has an excellent color rendering property and a high luminous flux as compared with a general illumination fluorescent lamp in which a halophosphate phosphor is used. However, the cost of a rare-earth phosphor used in this high color rendering type fluorescent lamp is several tens of times that of the halophosphate phosphor. For this reason, high color rendering type lamps are not popular yet.

An expensive rare-earth phosphor is used in a special-purpose lamp such as an exposure light source for electrophotography or the like.

In order to reduce the cost of such an expensive fluorescent lamp a technique is described in Published Unexamined Japanese Patent Application No. 53-867 wherein a light-emitting layer has a two-layered structure consisting of an inexpensive halophosphate phosphor layer and an expensive rare-earth phosphor layer formed thereon. According to this technique, an amount of expensive rare-earth phosphor is reduced, and an inexpensive halophosphate phosphor is used instead, thereby reducing cost without decreasing the luminance of the lamp. In a fluorescent lamp having this structure, sodium ions free from a glass bulb are adsorbed into the halophosphate phosphor layer directly coated on the glass bulb to prevent a chemical reaction between the sodium ions and mercury in the filling gas, thereby preventing deterioration of the fluorescent lamp. Although this fluorescent lamp is brighter than the fluorescent lamp coated with only the halophosphate phosphor, emission of the halophosphate phosphor excited by ultraviolet rays passing through the rare-earth phosphor causes a change in emission spectrum of the rare-earth phosphor.

FIG. 1 is a graph showing a luminous flux (curve a) of a high color rendering type fluorescent lamp having a halophosphate phosphor layer and a three component type phosphor layer, and a general color rendering index (to be referred to as Ra hereinafter) (curve b). This graph is obtained with a transparent glass tube whose inner surface is coated with:

2.0 g of a halophosphate to form a first layer; and a three component type phosphor consisting of a mixture of 25 wt % of $(Sr,Ca,Ba)_5(PO_4)_3.Cl:Eu$, 40 wt % of $LaPO_4:Ce,Tb$, and 35 wt % of $Y_2O_3:Eu$.

The above graph also shows measurement results of the luminous flux (curve a) and the general color rendering index (Ra) (curve b) of fluorescent lamps (FL40SS lamps) when the coating amount of the halophosphate phosphor is kept unchanged and the coating amount of the three component type phosphor is changed.

As is apparent from this graph, when the coating amount of the three component type phosphor is reduced, both the luminous flux and the index Ra are reduced. In particular, a decrease in Ra is significant. When a coating amount ratio of the three component type phosphor to the halophosphate phosphor is reduced, an ultraviolet absorbency of the three component type phosphor layer is reduced. The ultraviolet rays having passed through the three component type phosphor layer stimulate the halophosphate layer as the first layer to cause emission of the halophosphate layer.

The high color rendering fluorescent lamp having this structure cannot satisfy all characteristics, i.e., a high color rendering property, a high luminous flux, and low cost of the phosphor. When the phosphor cost is reduced, the luminous flux is reduced and the color rendering property is degraded.

This situation is not limited to the fluorescent lamp coated with the three component type phosphor but is also applicable to a fluorescent lamp having a halophosphate phosphor layer formed between a rare-earth phosphor layer and the glass bulb. For example, in a lamp in which a halophosphate phosphor layer is formed on the surface of, e.g., a $Y_2O_3:Eu$ phosphor layer, the coating amount of the $Y_2O_3:Eu$ phosphor is reduced to realize low cost. In this case, an emission color is changed, and the luminous flux is reduced.

SUMMARY OF THE INVENTION

It is an object of the present invention to provide a fluorescent lamp having a high luminous flux, a good color rendering property, and low cost.

A fluorescent lamp according to the present invention comprises an ultraviolet reflecting layer of a nonemission material consisting essentially of α-alumina and a light-emitting layer excited to emit light upon radiation caused by discharge, wherein the nonemission material is a white powder having an average grain size of 0.05 μm to 2 μm, and the light-emitting layer is formed on that surface of the ultraviolet reflecting layer which faces on a discharge region. According to the present invention, the ultraviolet rays having passed through the light-emitting layer without being absorbed are reflected by the ultraviolet reflecting layer and become incident on the light-emitting layer again. For this reason, the light-emitting layer is frequently excited, and the luminous flux is increased. According to the present invention, even if the amount of phosphor used in the light-emitting layer is reduced, a sufficiently high luminous flux, is obtained. Consequently, cost can be effectively reduced. This effect becomes more conspicuous when a phosphor is expensive. In addition, according to the present invention, since the ultraviolet reflecting layer consists of the nonemission material, the color rendering property of the light-emitting layer is not degraded. The brightness of the fluorescent lamp may be slightly reduced due to the presence of this nonemission material. However, such degradation is negligible.

DETAILED DESCRIPTION OF THE PREFERRED EMBODIMENT

Figure 1:
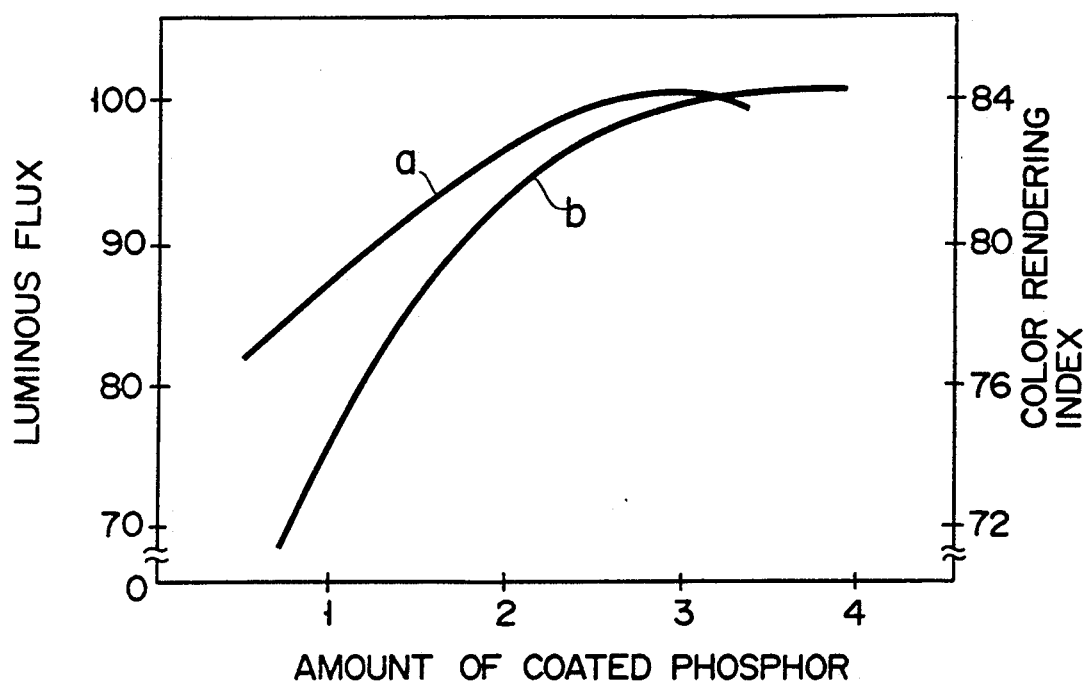
FIG. 1 is a graph showing the luminous flux and the general color rendering index with respect to a coating amount of a three component type emission phosphor of a high color rendering fluorescent lamp having a conventional two-layered phosphor layer.

According to the present invention, in order to achieve the above object of the present invention, a fluorescent lamp is realized by a principle entirely different from that of a conventional fluorescent lamp. That is, excellent properties can be obtained by using an ultraviolet reflecting layer which does not emit light.

In order to achieve the above arrangement, the fluorescent lamp of the present invention has the following features:

(a) The fluorescent lamp comprises an ultraviolet reflecting layer consisting essentially of a nonemission material and a light-emitting layer formed on the ultraviolet reflecting layer to emit light upon radiation caused by discharge.

(b) The light-emitting layer is coated on that surface of the ultraviolet reflecting layer which faces on a discharge region so as to be excited with ultraviolet rays and to emit light. The ultraviolet reflecting layer is coated on the inner surface of the glass bulb to reflect the ultraviolet rays having passed through the light-emitting layer so as to excite the light-emitting layer with the ultraviolet rays again.

(c) The ultraviolet reflecting layer is coated with a white powder of a nonemission material consisting essentially of α-alumina.

The white powder constituting the ultraviolet reflecting layer may consist essentially of α-alumina whose spectral reflectance for ultraviolet rays having a wavelength of 200 nm or more is given as 90 g or more when a reflectance of an MgO diffusion plate is given as 100g. Examples of the powder having a high spectral reflectance for ultraviolet rays are powders of silica, barium sulfate, and calcium phosphate and powder mixtures thereof, each of powders and powder mixtures having a reflectance of 90% or more for ultraviolet rays. However, when α-alumina is used, a high luminous flux, a high luminous flux maintenance, and a good color rendering property are obtained. It is also possible to add the above white powder to α-alumina.

(d) The average gain size of the white powder of the ultraviolet reflecting layer is adjusted to fall within the range of 0.05 μm to 2 μm. When the average grain size of the white powder is less than 0.05 μm, the grain size is smaller than the wavelength of ultraviolet rays, and reflection efficiency of the ultraviolet rays is degraded. The ultraviolet rays having passed through the light-emitting layer cannot be sufficiently reflected.

When a white powder having an average grain size exceeding 2 μm is used, the coating amount must be increased to obtain a desired effect, and cost is increased. The luminous flux of a fluorescent lamp is not increased contrary to an increase in cost.

More preferably, the average grain size of the white powder is controlled to fall within the range of 0.15 μm to 1 μm. A white powder having an average grain size of 0.15 μm or more can facilitate powder classification and can reduce the cost, thus enhancing the effect of the present invention.

A coating amount of the ultraviolet reflecting layer may be controlled to fall within the range of 0.05 to 5 mg/cm$^2$. When the amount is smaller than 0.05 mg/cm$^2$, a predetermined luminous flux may not be obtained. However, when the amount exceeds 5.0 mg/cm$^2$, the luminous flux may not be increased to only result in high cost.

(e) The following phosphors may be used for the light-emitting layer singly or in a combination of two or more thereof:

$(Sr,Ca,Ba,Mg)_5(PO_4)_3Cl:Eu$ phosphor,
$BaMg_2Al_{16}O_{27}:Eu$ phosphor,
$LaPO_4:Ce,Tb$ phosphor,
$MgAgl_{11}O_{19}:Ce,Tb$ phosphor,
$Y_2SiO_5:Ce,Tb$ phosphor,
$Y_2O_3:Eu$ phosphor,
$Y(PV)O_4:Eu$ phosphor,
$(3.5)MgO(0.05)MgF_2GeO_2:Mn$ phosphor, etc.

Figure 2:
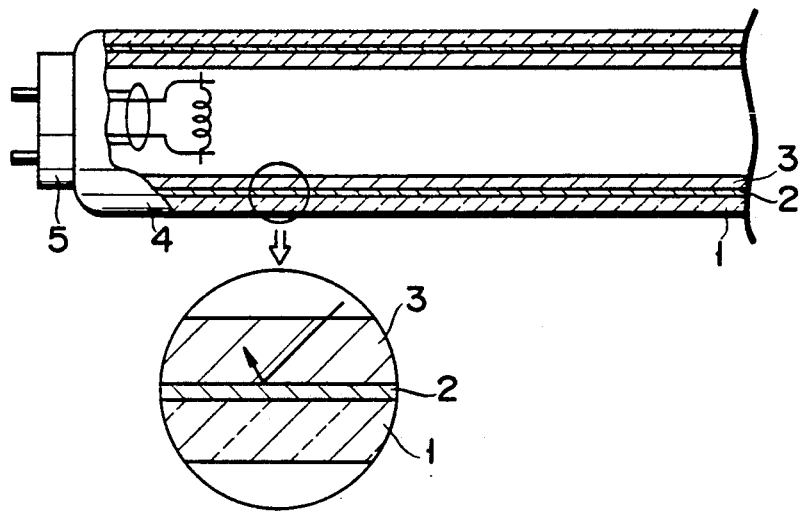
FIG. 2 is a partially cutaway sectional view showing part of a fluorescent lamp according to an embodiment of the present invention.

A fluorescent lamp according to one embodiment of the present invention comprises, e.g., a glass bulb 1, an ultraviolet reflecting layer 2 formed on the inner surface of the bulb 1, a light-emitting layer 3 formed on the surface of the ultraviolet reflecting layer 2, a pair of electrodes 4 formed in the bulb 1, and sockets 5 for closing both ends of the bulb 1, as shown in FIG. 2.

The ultraviolet reflecting layer 2 reflects ultraviolet rays having passed through the light-emitting layer 3 without being absorbed in the light-emitting layer 3. The ultraviolet rays reflected by the ultraviolet reflecting layer 2 excite the phosphor of the light-emitting layer 3 to cause emission of light from the light-emitting layer 3 again. In particular, the ultraviolet rays reflected by the ultraviolet reflecting layer 2 cause emission of the light-emitting layer 3 on the glass surface side. Light emitted from the glass surface side of the light-emitting layer 3 does not pass through the light-emitting layer 3 and is radiated outside through the ultraviolet reflecting layer 2, thereby obtaining a high luminous flux. That is, the light-emitting layer 3 is excited with the ultraviolet rays on both sides, thereby achieving highly efficient emission.

The ultraviolet reflecting layer 2 is used to reflect the ultraviolet rays, but slightly attenuates light emitted from the light-emitting layer 3. When a light attenuation amount at the ultraviolet reflecting layer 2 is high, a high luminous flux of the fluorescent lamp cannot be increased even if this layer reflects the ultraviolet rays.

The present inventors, however, succeeded in manufacturing lamp samples having a high luminous flux since a light attenuation amount of the ultraviolet reflecting layer 2 was smaller than an amount obtained when this layer reflected the ultraviolet rays to increase a brightness of the light-emitting layer 3.

In addition, ultraviolet excitation efficiency of the light-emitting layer can be improved to increase the luminous flux by the ultraviolet reflecting layer 2 which is less expensive than the light-emitting layer 3.

The ultraviolet reflecting layer 2 also protects the light-emitting layer 3 as an additional effect. That is, the ultraviolet reflecting layer prevents a reaction between sodium ions in soda glass and mercury in the filling gas, thereby preventing deterioration of the fluorescent lamp.

A conventional fluorescent lamp having a protective layer formed between a light-emitting layer and a glass bulb has already been available. The protective film prevents a chemical reaction between sodium ions in soda glass and mercury contained in the filling gas to prevent deterioration of the fluorescent lamp. In the fluorescent lamp having a protective film, light emitted from the light-emitting layer is radiated outside the lamp through the protective film. Therefore, the protective film must have a high transmittance because the luminous flux of fluorescent lamp is decreased when the protective film absorbs the light. A transparent protective film is used for this purpose. The transparent film genera consists of an extremely fine alumina grain having a grain size as small as 30 mμm or less. Visible light passes through the transparent protective film, and this film has a low ultraviolet reflectance. Therefore, the transparent protective film cannot be used as an ultraviolet reflecting layer of the present invention.

The present invention will be described in detail by way of its examples.

EXAMPLE 1–6

1.8 g of α-alumina having a grain size of 0.3 μm were coated on the inner surface of a glass bulb 1 to form an ultraviolet reflecting layer as a first layer. A three component type phosphor mixture containing 10% of an $(Sr,Ca,Ba,Mg)_5(PO_4)_3 Cg:Eu$ phosphor, 30% of an $LaPO_4:CeTb$ phosphor, and 60% of a $Y_2O_3:Eu$ phosphor was coated on the first layer to form a light-emitting layer as a second layer. Six fluorescent lamp samples (FIG. 2) were manufactured by a conventional method by changing coating amounts of the first and second layers as shown in Table 1. Luminous fluxes, color rendering index Ra, luminous flux maintenance, chromaticity coordinate values x and y, and color shift values after 500 hours of the lamp samples were measured as lamp characteristics. Measurement results are summarized in Table 1. As is apparent from Table 1, these samples had excellent properties.

EXAMPLE 7–9

Three fluorescent lamp samples were manufactured following the same procedures as in Example 1 except that a three component type phosphor mixture containing 25% of an $(Sr,Ca,Ba,Mg)_5(PO_4)_3.Cl:Eu$ phosphor, 30% of an $LaPO_4:Ce,Tb$ phosphor, and 45% of a $Y_2O_3:Eu$ phosphor was used to form a second layer in an amount shown in Table 1, and the characteristics of these samples were measured. The measurement results are summarized in Table 1. As is apparent from this table, the characteristics of the samples were excellent.

EXAMPLE 10

A fluorescent lamp sample was manufactured following the same procedures as in Example 1 except that only an $(Sr,Ca,Ba,Mg)_5(PO_4)3.Cl:Eu$ phosphor was used as a second layer. Lamp characteristics were measured, and excellent results were obtained, as shown in Table 1.

EXAMPLE 11

A fluorescent lamp sample was manufactured following the same procedures as in Example 1 except that only an $LaPO_4:Ce,Tb$ phosphor was used as a second layer. Lamp characteristics were measured, and excellent results were obtained, as shown in Table 1.

EXAMPLE 12

A fluorescent lamp sample was manufactured following the same procedures as in Example 1 except that only a $Y_2O_3:Eu$ phosphor was used as a second layer. Lamp characteristics were measured, and excellent results were obtained, as shown in Table 1.

EXAMPLE 13–16

Four fluorescent lamp samples were manufactured following the same procedures as in Example 1 except that α-alumina coating layers having grain sizes and coating amounts shown in Table 1 were formed as first layers, and lamp characteristics were measured.

CONTROLS 1–4

Fluorescent lamps were manufactured following the same procedures as in Examples 1 to 4 except that γ-alumina was used to form first layers in amounts shown in Table 2. Lamp characteristics were measured.

CONTROLS 5–7

A fluorescent lamp sample was manufactured following the same procedures as in Example 10 except that second layers were directly formed on bulbs without forming first layers. Lamp characteristics were measured.

CONTROLS 8–10

A fluorescent lamp sample was manufactured following the same procedures as in Example 11 except that second layers were directly formed on bulbs without forming first layers. Lamp characteristics were measured.

CONTROLS 11–13

A fluorescent lamp sample was manufactured following the same procedures as in Example 12 except that second layers were directly formed on glass bulbs without forming first layers. Lamp characteristics were measured.

CONTROLS 14 & 15

Fluorescent lamp samples were manufactured following the same procedures as in Example 1 except that light-emitting layers consisting of halophosphate phosphors were formed as light-emitting layers, and nonemitting layers consisting of titanium oxide were formed, and lamp characteristics were measured.

TABLE 1

| | First Layer | | | Second Layer | | | Luminous Flux Holding | Color Point | | 500-Hour Color Shift |
|---|---|---|---|---|---|---|---|---|---|---|
| | Compound | Coating Amount (g) | Grain Size (μm) | Coating Amount (g) | Luminous Flux (Lm) | Ra (%) | Rate (%) | X Value | Y Value | X Value/ Y Value |
| Example 1 | α-Al$_2$O$_3$ | 1.8 | 0.3 | 1.0 | 3553 | 84.0 | 94.8 | 0.431 | 0.399 | +0.001/+0.001 |
| Example 2 | " | 1.0 | 0.3 | 2.0 | 3637 | 83.8 | 95.5 | 0.431 | 0.396 | +0.001/+0.001 |
| Example 3 | " | 0.5 | 0.3 | 3.0 | 3700 | 84.0 | 96.2 | 0.431 | 0.401 | +0.001/+0.001 |
| Example 4 | " | 0.2 | 0.3 | 4.0 | 3750 | 85.8 | 95.0 | 0.427 | 0.394 | +0.000/+0.001 |
| Example 5 | " | 0.5 | 0.3 | 2.0 | 3540 | 82.5 | 94.9 | 0.435 | 0.395 | — |
| Example 6 | " | 1.4 | 0.3 | 2.0 | 3633 | 82.7 | 95.0 | 0.432 | 0.396 | — |
| Example 7 | " | 1.8 | 0.3 | 1.0 | 3524 | 82.5 | 94.5 | 0.346 | 0.345 | — |
| Example 8 | " | 1.0 | 0.3 | 2.0 | 3566 | 83.2 | 95.0 | 0.344 | 0.342 | — |

TABLE 1-continued

| | First Layer | | | Second Layer | | | Luminous Flux | Color Point | | 500-Hour Color Shift |
|---|---|---|---|---|---|---|---|---|---|---|
| | Compound | Coating Amount (g) | Grain Size (μm) | Coating Amount (g) | Luminous Flux (Lm) | Ra (%) | Holding Rate (%) | X Value | Y Value | X Value/ Y Value |
| Example 9 | " | 0.6 | 0.3 | 3.0 | 3629 | 84.0 | 96.5 | 0.345 | 0.341 | — |
| Example 10 | " | 1.0 | 0.3 | 2.0 | 1268 | — | 96.0 | 0.161 | 0.108 | — |
| Example 11 | " | 1.0 | 0.3 | 2.0 | 5180 | — | 95.4 | 0.328 | 0.533 | — |
| Example 12 | " | 1.0 | 0.3 | 2.0 | 2732 | — | 98.0 | 0.578 | 0.323 | — |
| Example 13 | " | 0.3 | 0.05 | 2.0 | 3590 | 83.0 | 95.5 | 0.431 | 0.395 | +0.001/+0.002 |
| Example 14 | " | 0.5 | 0.1 | 2.0 | 3622 | 83.5 | 95.5 | 0.431 | 0.395 | +0.001/+0.002 |
| Example 15 | " | 2.5 | 1.5 | 2.0 | 3620 | 83.5 | 95.5 | 0.431 | 0.395 | +0.001/+0.000 |
| Example 16 | " | 4.0 | 3.0 | 2.0 | 3558 | 82.5 | 94.2 | 0.431 | 0.397 | +0.002/+0.003 |
| Control 1 | γ-Al$_2$O$_3$ | 1.0 | 0.03 | 1.0 | 3352 | 82.3 | 89.8 | 0.431 | 0.399 | +0.004/+0.005 |
| Control 2 | " | 1.0 | 0.03 | 2.0 | 3423 | 82.5 | 93.0 | 0.431 | 0.396 | +0.003/+0.004 |
| Control 3 | " | 0.2 | 0.03 | 3.0 | 3650 | 83.5 | 94.2 | 0.431 | 0.401 | +0.004/+0.003 |
| Control 4 | " | 0.09 | 0.03 | 4.0 | 3700 | 84.2 | 93.0 | 0.427 | 0.394 | +0.004/+0.003 |
| Control 5 | None | None | | 2.0 | 1202 | — | 90.3 | — | — | — |
| Control 6 | None | None | | 3.0 | 1262 | — | 92.7 | — | — | — |
| Control 7 | None | None | | 4.0 | 1290 | — | 94.0 | — | — | — |
| Control 8 | None | None | | 2.0 | 4911 | — | 90.2 | — | — | — |
| Control 9 | None | None | | 3.0 | 5154 | — | 91.8 | — | — | — |
| Control 10 | None | None | | 4.0 | 5270 | — | 93.9 | — | — | — |
| Control 11 | None | None | | 2.0 | 2585 | — | 91.0 | — | — | — |
| Control 12 | None | None | | 3.0 | 2697 | — | 92.7 | — | — | — |
| Control 13 | None | None | | 4.0 | 2780 | — | 94.5 | — | — | — |
| Control 14 | Halo-phosphate Phosphor | 2.0 | — | 2.0 | 3550 | 81.0 | 94.5 | 0.434 | 0.394 | — |
| Control 15 | TiO$_2$ | 1.0 | 0.3 | 2.0 | 3247 | 83.2 | 95.0 | 0.436 | 0.399 | — |

The above results in Table 1 indicate the following.

The lamps (Examples 1 to 12) having the three component type phosphor layers and ultraviolet reflecting layers have higher luminous fluxes, larger values Ra, and higher luminous flux holding rates than the conventional lamp (Control 14) having the three component type phosphor layer and the halophosphate phosphor layer. When titanium oxide (Control 15) or γ-alumina (Controls 1 to 4) is used in place of α-alumina to form the ultraviolet reflecting layers, higher luminous fluxes and higher luminous flux holding rates cannot be obtained In addition, when the rare-earth phosphor layers are formed without the ultraviolet reflecting layers as the first layers (Controls 5 to 13), sufficient characteristics cannot be obtained unless the amount of phosphor used in the lamp of the present invention is increased As is apparent from Table 1, the fluorescent lamp having the ultraviolet reflecting layer has better characteristics than the fluorescent lamp having a single phosphor layer or the fluorescent lamp having the halophosphate phosphor and the three component type phosphor.

For example, in the conventional high color rendering type fluorescent lamp having the halophosphate phosphor and the three component type phosphor, the halophosphate phosphor is excited by the ultraviolet rays having passed through the three component type phosphor. To the contrary, in the high color rendering fluorescent lamp of the present invention, the ultraviolet rays having passed through the light-emitting layer are reflected to excite the light-emitting layer again.

As compared with a conventional fluorescent lamp wherein ultraviolet rays having passed through the three component type phosphor layer directly excite the halophosphate phosphor layer to cause emission of the halophosphate phosphor layer, it is appeared that the luminous flux may be decreased in the fluorescent lamp (present invention) wherein the ultraviolet rays having passed through the light-emitting layer are reflected to reexcite the light-emitting layer That is since the ultraviolet reflectance cannot exceed 100%, excitation energy of the ultraviolet rays having passed through the light-emitting layer to directly excite another light-emitting layer is higher than the reflected ultraviolet rays.

However, in practice, the coating amount of the halophosphate phosphor on the surface of the three component type phosphor layer, i.e., on the inner surface of the bulb is limited. It is impossible to form a halophosphate phosphor layer having a thickness enough to absorb the ultraviolet rays having passed through the three component type phosphor layer because the halophosphate phosphor layer is required to have a transmittance enough to pass the light from the three component type phosphor layer. If the halophosphate phosphor absorbs emission from the three component type phosphor, the index Ra of the fluorescent lamp is greatly decreased, and the luminescence brightness of the lamp as a whole is greatly degraded, resulting in an impractical application.

The measurement data of the present invention proves that emission by ultraviolet reflection of the ultraviolet reflecting layer is better than direct excitation of the halophosphate phosphor.

What is claimed is:

1. A fluorescent lamp comprising a bulb, an ultraviolet reflecting layer consisting essentially of a nonemission material formed on an inner surface of the bulb, and a light-emitting layer formed on the ultraviolet reflecting layer and excited to emit light upon discharge, wherein the nonemission material consists essentially of α-alumina having an average grain size of 0.05 μm to 2 μm, and the coating amount of the ultraviolet reflecting layer on the inner surface of the bulb if 0.05 to 5 mg/cm$^2$.

2. A lamp according to claim 1, wherein the light-emitting layer consists essentially of a rare-earth phosphor.

3. A lamp according to claim 1, wherein the nonemission material has an average grain size of 0.15 to 1.0 μm.

4. A fluorescent lamp according to claim 1, wherein the light-emitting layer essentially consists of at least one phosphor selected from the group consisting of an $(Sr,Ca,Ba,Mg)_5(PO_4)_3Cl:Eu$ phosphor, a $BaMg_2Al_{16}O_{27}:Tb$ phosphor, an $LaPO_4:Ce,Tb$ phosphor, an $MgAl_{11}O_{19}:Ce,Tb$ phosphor, a $Y_2SiO_5:Ce,Tb$ phosphor, a $Y_2O_3:Eu$ phosphor, a $Y(PV)O_4:Eu$ phosphor, an a $(3.5)MgO(0.05)MgF_2GeO_2:Mn$ phosphor.

* * * * *